(12) United States Patent
Chen et al.

(10) Patent No.: US 12,312,479 B2
(45) Date of Patent: May 27, 2025

(54) PRINTABLE DISPERSION WITH TUNABLE VISCOSITY

(71) Applicant: Brewer Science, Inc., Rolla, MO (US)

(72) Inventors: Zun Chen, Springfield, MO (US); Jonathan J. Fury, Springfield, MO (US); Alec Neeson, Springfield, MO (US)

(73) Assignee: Brewer Science, Inc., Rolla, MO (US)

( * ) Notice: Subject to any disclaimer, the term of this patent is extended or adjusted under 35 U.S.C. 154(b) by 1048 days.

(21) Appl. No.: 17/208,386

(22) Filed: Mar. 22, 2021

(65) Prior Publication Data

US 2021/0292581 A1 Sep. 23, 2021

Related U.S. Application Data

(60) Provisional application No. 62/993,325, filed on Mar. 23, 2020.

(51) Int. Cl.
*C09D 11/106* (2014.01)
*B41M 1/12* (2006.01)
(Continued)

(52) U.S. Cl.
CPC ............. *C09D 11/106* (2013.01); *B41M 1/12* (2013.01); *B41M 1/30* (2013.01); *B41M 5/0023* (2013.01);
(Continued)

(58) Field of Classification Search
CPC ........ B41M 1/12; B41M 1/30; B41M 5/0023; B41M 5/0047; B41M 5/0064;
(Continued)

(56) References Cited

U.S. PATENT DOCUMENTS 5,211,984 A 5/1993 Wilson et al.
6,679,979 B2 * 1/2004 Gervais .................... C08J 3/075
526/89

(Continued)

FOREIGN PATENT DOCUMENTS

CN 107283704 10/2017
EP 1387422 A1 * 2/2004 ............ B01J 35/065
KR 10-2020-0060851 6/2020

OTHER PUBLICATIONS

Di Noto et al, "Influence of Anions on Proton-Conducting Membranes Based on Neutralized Nafion 117, Triethylammonium Methanesulfonate, and Triethylammonium Perfluorobutanesulfonate. 2. Electrical Properties," The Journal of Physical Chemistry C, 2012 (published Dec. 6, 2011), 116(1), pp. 1370-1379, 10 pages.

(Continued)

*Primary Examiner* — Christopher M Polley
*Assistant Examiner* — Sathavaram I Reddy
(74) *Attorney, Agent, or Firm* — HOVEY WILLIAMS LLP

(57) ABSTRACT

A copolymer of polytetrafluoroethylene and a perfluoro acid (e.g., Nafion™) is neutralized by a base to yield its corresponding salt, and a high-boiling-point compatible solvent is used as a substituting solvent, with the original, low-boiling-point solvent being removed by rotor evaporation. The resulting dispersion is screen printable, and its viscosity is controllable by adjusting its solids content. This screen-printable salt dispersion is especially useful in printed electronics applications such as sensors.

10 Claims, 3 Drawing Sheets

(51) Int. Cl.
*B41M 1/30* (2006.01)
*B41M 5/00* (2006.01)
*C08F 214/18* (2006.01)
*C08F 214/26* (2006.01)
*C09D 11/033* (2014.01)

(52) U.S. Cl.
CPC ........ *B41M 5/0047* (2013.01); *B41M 5/0064* (2013.01); *C08F 214/184* (2013.01); *C08F 214/262* (2013.01); *C09D 11/033* (2013.01); *C08F 2810/50* (2013.01)

(58) Field of Classification Search
CPC .............. C08F 214/184; C08F 214/262; C08F 2810/50; C09D 11/033; C09D 11/106; C09D 11/033106
See application file for complete search history.

(56) References Cited

U.S. PATENT DOCUMENTS

2003/0109631 A1 6/2003 Gervais et al.
2006/0110631 A1 5/2006 Olmeijer et al.
2010/0237278 A1 9/2010 Kim et al.

OTHER PUBLICATIONS

Kim et al., "Origin of Toughness in Dispersion-Cast Nafion Membranes," Macromolecules, Mar. 23, 2015, 48(7), pp. 2161-2172, 12 pages.
Bayer et al., "Spray deposition of Nation membranes: Electrode-supported fuel cells," Journal of Power Sources, 2016, 327, pp. 319-326, 8 pages.
Guo et al., "Modification for Uniform Surface of Nafion Ultrathin Film Deposited by Inkjet Printing," Langmuir, Sep. 1, 2015, 31(37), pp. 10137-10144, 8 pages.
Carrico et al., "Fused Filament Additive Manufacturing of Ionic Polymer-Metal Composite Soft Active 3D Structures," Proceedings of the ASME 2015 Conference on Smart Materials, Adaptive Structures and Intelligent Systems, SMASIS2015, Sep. 21-23, 2015, Colorado Springs, Colorado, 9 pages.
International Search Report and Written Opinion mailed Nov. 16, 2021 in corresponding PCT/US2021/023450 filed Mar. 22, 2021, 12 pages.
Machine translation of CN107283704, 8 pages.
Machine translation of KR-10-2020-0060851, 17 pages.

* cited by examiner

PRINTABLE DISPERSION WITH TUNABLE VISCOSITY

RELATED APPLICATIONS

The present application claims the priority benefit of U.S. Provisional Patent Application Ser. No. 62/993,325 filed Mar. 23, 2020, entitled PRINTABLE DISPERSION WITH TUNABLE VISCOSITY, incorporated by reference in its entirety herein.

STATEMENT REGARDING FEDERALLY SPONSORED RESEARCH OR DEVELOPMENT

This invention was made with Government support under W912HZ-18-2-0003 entitled "PRINTED ELECTRONIC NANO CARBON BASED DEVICES AND SYSTEMS TO IMPROVE REAL-TIME SURFACE WATER CONTAMINATION SENSING," subaward 18004-001 awarded by the Department of the Army ERDC. The United States Government has certain rights in the invention.

BACKGROUND

Field

The present disclosure relates to methods of preparing and using printable dispersions.

Description of Related Art

The polymer available under the name Nafion™ was invented in late 1960s by DuPont. It was produced by incorporating perfluorovinyl ether groups terminated with sulfonate groups onto a tetrafluoroethylene ("PTFE") backbone.

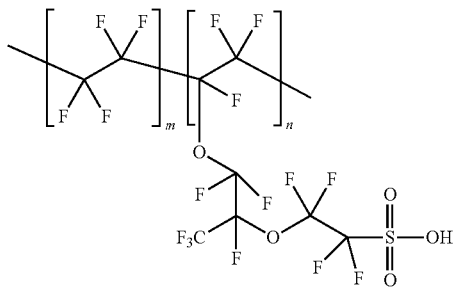

The polymer's unique ionic properties make it suitable for a broad range of applications, including production of sensors, such as ion-selective sensors, metallized sensors, optical sensors, and biosensors. Furthermore, the Nafion™ material has been shown to be stable in cell cultures as well as in the human body, and there is considerable research towards its use in the production of higher sensitivity glucose sensors.

The fabrication of printable sensors is a growing trend, however, the Nafion™ material is not suitable for use in large-scale production of printed electronics. Generally, the commercially available Nafion™ polymer dispersions use 1-propanol, ethanol, mixed ethers, and VOC solvents that are of a low viscosity that is not suitable for screen printing. The commercially available materials also have strong acidic properties, with the acidic form being a very strong acid with a pKa of about −6.

SUMMARY

In one embodiment, the present disclosure is concerned with a method comprising reacting a polymer with a base to form a salt thereof. The polymer is dispersed or dissolved in a solvent system comprising one or more original solvents, and the polymer comprises

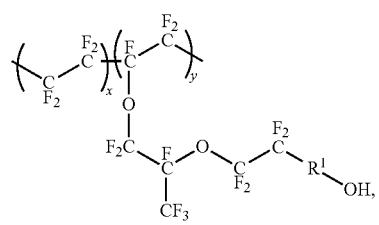

where $R^1$ is chosen from

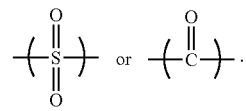

In another embodiment, the invention provides a dispersion or solution comprising a salt of a polymer having the structure

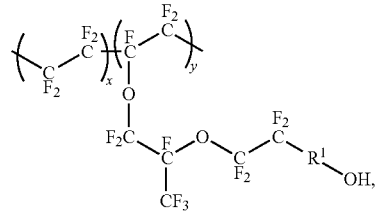

where $R^1$ is chosen from

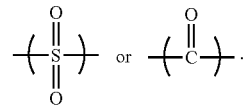

In a further embodiment, a method that comprises forming a film of this dispersion or solution on a surface of a substrate is provided.

In yet a further embodiment, an article that comprises a film of this dispersion or solution on a surface of a substrate is provided.

The invention also provides an article comprising a film on a surface of a substrate. The film comprises a salt of a polymer having the structure

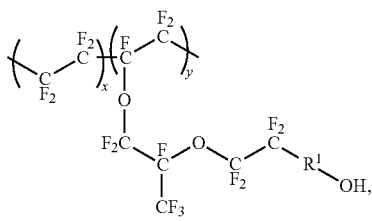

where $R^1$ is chosen from

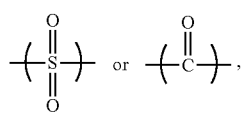

wherein the film comprises less than about 10% by weight triethylammonium methanesulfonate and less than about 20% by weight triethylammonium perfluorobutanesulfonate.

In yet another embodiment, the disclosure provides a device comprising this article. The device is chosen from sensors, electrodes, ion selective membranes, ion exchange membranes, impedance adjustors, ionic conductive binding, and fuel cells.

DETAILED DESCRIPTION

Figure 1:
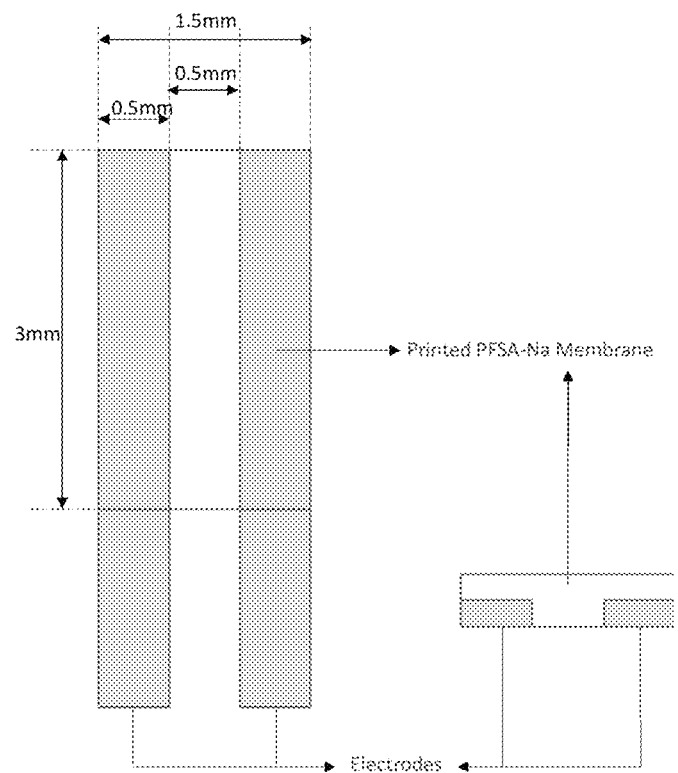
FIG. 1 schematically depicts the structure used in impedance testing.

The present disclosure is concerned with a printable dispersion, methods of forming and of using the printable dispersion, and articles formed with that dispersion.

Preparation of Dispersion

The dispersions are prepared by neutralizing an acidic polymer with a base to convert it to its corresponding salt. The polymer is preferably dispersed or dissolved in a solvent system comprising one or more solvents. Solvents typically present in such dispersions include 1-propanol, ethanol, mixed ethers, VOC solvents, and mixtures thereof. The total solvent(s) will typically be present in these dispersions at levels of about 65% by weight to about 90% by weight, and more preferably from about 75% by weight to about 85% by weight, with the balance of the weight being attributable to solids in the dispersion, and those solids being largely or entirely the acidic polymer solids.

The preferred acidic polymer is a copolymer of perfluoro acid ("PFA") and polytetrafluoroethylene ("PTFE") and comprises the structure

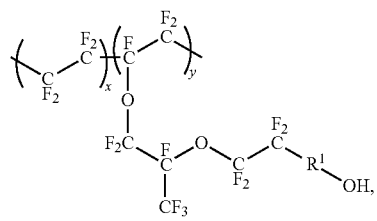

where $R^1$ is chosen from

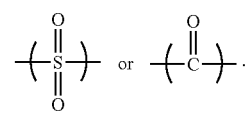

In one embodiment, the polymer has a weight average molecular weight of about 100 g/mol to about 2,000 g/mol, preferably about 200 g/mol to about 1,000 g/mol, and more preferably about 400 g/mol to about 600 g/mol.

In another embodiment, the molar ratio of x:y is about 3:1 to about 1:99, preferably about 1.2:1 to about 1:4, and more preferably about 1:1 to about 1:1.5.

One such polymer is commercially available as Nafion™ PFSA 20% Dispersions-D2021 and Nafion™ PFSA 20% Dispersions-D2020 (Fuel Cell Store, College Station, Texas) and comprises the structure

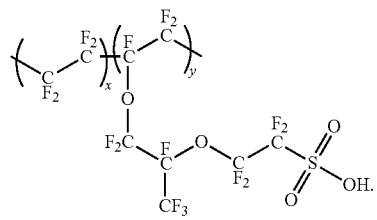

Neutralization is preferably accomplished by titrating the dispersion with a base. Suitable bases are Lewis bases and include sodium hydroxide, tetrabutylammonium hydroxide, silver acetate, silver lactate, zinc acetate, potassium hydroxide, tetraethylammonium hydroxide, tetramethylammonium hydroxide, sodium bicarbonate, ammonium hydroxide, sodium carbonate, and mixtures thereof. The final pH of the titrated solution is preferably from about 6.8 to about 7.2, more preferably from about 6.98 to about 7.02, and even more preferably about 7.

The resulting salt is preferably one or more of the acidic polymer's sodium salt, potassium salt, silver salt, ammonium salt, tetramethylammonium salt, tetraethylammonium salt, tetrabutylammonium salt, and/or zinc salt. In a preferred embodiment, the resulting salt comprises the structure

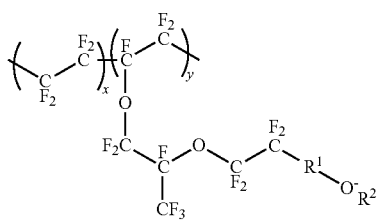

wherein $R^2$ is chosen from $Na^+$, $K^+Ag^+$, $NH^{4+}$, $Zn^{2+}$,

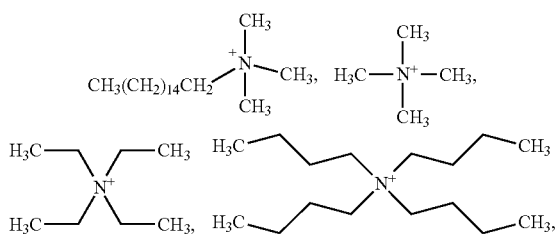

and mixtures of the foregoing.

Next, the resulting salt dispersion is subjected to a "solvent swap" to replace the low-boiling-point solvent that is part of the commercially available product with a new, high(er)-boiling-point solvent(s) that is capable of completely solubilizing the salt of this dispersion. The substitute solvent(s) is preferably added to the salt dispersion at a level of from about 50% by weight to about 500% by weight, and more preferably from about 80% by weight to about 120% by weight, based upon the total weight of the salt dispersion taken as 100% by weight. The boiling point of the high-boiling-point solvent(s) is preferably from about 100° C. to about 300° C., and more preferably from about 125° C. to about 250° C., particularly when the final material will be used for screen printing, stencil coating, or drawdown printing.

Suitable new (i.e., substitute) solvents include those chosen from water, 2-methyl-1,3 propanediol, 1,2-propanediol, 1,3-propanediol, 1,2-butanediol, 2,3-butanediol, 1,3-butanediol, 1,4-butanediol, 1,2-pentanediol, 2,4-pendanediol, 1,2-hexanediol, glycerol, 1,2,4-butanetriol butyl carbitol acetate, propylene carbonate, dimethyl glutarate, diethyl adipate, dimethyl adipate, propiophenone, N,N-dimethylacetamide, N,N-dimethylformamide, N-methyl-pyrrolidone, dimethyl sulfoxide, ethylene glycol, and mixtures thereof.

The majority of the original, low-boiling-point solvent or solvents is then removed. One preferred method for removing the low-boiling-point solvent or solvents is by rotor evaporation. Rotor evaporation is preferably performed at temperatures of from about 50° C. to about 75° C., and more preferably from about 60° C. to about 65° C. This preferably results in the removal of at least about 75%, preferably at least about 80%, more preferably at least about 95%, and even more preferably about 100% of the original solvent(s).

After removal of the original, low-boiling-point solvent(s), the resulting "solvent-swapped" salt dispersion with the new, high-boiling-point solvent system can be used as obtained. Advantageously, the viscosity of this solvent-swapped salt dispersion can also be controlled by adjusting the percent solids. The percent solids may be altered by evaporating some of the new solvent to increase the percent solids, and consequently, viscosity, or by incorporating additional substitute solvent(s) to decrease the percent solids, and consequently, viscosity.

When used for screen printing, stencil coating or drawdown printing, the resulting solvent-swapped salt dispersion is preferably from about 10% by weight solids to about 35% by weight solids, and more preferably from about 15% by weight solids to about 25% by weight solids, with the balance of the dispersion in each instance being solvent. The viscosity of the resulting solvent-swapped salt dispersion, as measured by a Brookfield DV2T Viscometer (AMETEK Brookfield, Middleboro, MA, USA) at 25° C., is preferably from about 200 cP to about 8,000 cP, and more preferably from about 500 cP to about 5,500 cP.

When used for ink-jet printing or spray coating, the resulting solvent-swapped salt dispersion is preferably from about 0.2% by weight solids to about 20% by weight solids, and more preferably from about 0.5% by weight solids to about 5% by weight solids, with the balance of the dispersion in each instance being solvent. The viscosity of the resulting solvent-swapped salt dispersion, as measured by a Brookfield DV2T Viscometer (AMETEK Brookfield, Middleboro, MA, USA) at 25° C., is preferably from about 5 cP to about 500 cP, and more preferably from about 5 cP to about 250 cP.

Optional ingredients may be added, such as rheology modifiers, surfactants, cosolvents, and combinations thereof. Suitable rheology modifiers include bentonite clay and organic derivatives thereof (e.g., BENTONE SDR-2, BENTONE SD®-3, both available from Elementis, Windsor, NJ), cationic dispersants (e.g., Hypermer™ MKD1, Hypermer™ MKD6, both available from Croda Advanced Materials), and combinations thereof. When a rheology modifier is included, it is present at levels of from about 0.1% by weight to about 5% by weight, preferably from about 0.5% by weight to about 3% by weight, and more preferably about 1% by weight, based upon the total weight of the solvent-swapped salt dispersion, or on the combined weights of the solvent-swapped salt dispersion and the cosolvent, in embodiments where a cosolvent is also included.

Suitable cosolvents include, but are not limited to, water, alcohols, other high-boiling-point solvents as described above, and combinations thereof. It will be appreciated that depending on the printing technology, the amount and type of cosolvent may vary greatly. When a cosolvent is included for screen-printable, draw-down-printable, and stencil-printable ink formulations, it is present at levels of from about 0.01% by weight to about 99.9% by weight, preferably from about 0.05% by weight to about 80% by weight, and more preferably from about 0.1% to about 10% by weight, based upon the combined weights of the solvent-swapped salt dispersion and the cosolvent. When a cosolvent is included for ink-jet-printable and spray-printable ink formulations, it is present at levels of from about 80% by weight to about 99.99% by weight, and preferably from about 90% by weight to about 99.95% by weight, based upon the combined weights of the solvent-swapped salt dispersion and the cosolvent. Cosolvents can be beneficial in situations where the intended printing technique requires a lower boiling point solvent system (lower relative to the boiling point of the solvent system if the cosolvent weren't present, e.g., at least about 20° C. lower, preferably at least about 50° C. lower, and more preferably at least about 50° C. to about 100° C. lower).

Surfactants include fluorosurfactants (e.g., nonionic ones such as Capstone™ FS3100, available from The Chemours Company FC, LLC), sodium dodecyl sulfate, polyethylene glycol tert-octylphenyl ether (such as that available under the name Triton™ X-100, from Sigma-Aldrich, Inc.), and combinations thereof. When a surfactant is included, it is present at levels of from about 0.01% by weight to about 2% by weight, preferably from about 0.05% by weight to about 0.5% by weight, and more preferably about 0.2% by weight, based upon the total weight of the solvent-swapped salt dispersion, or on the combined weights of the solvent-swapped salt dispersion and the cosolvent, in embodiments where a cosolvent is also included.

In one embodiment, the dispersion consists essentially of, or even consists of, the salt and high-boiling point solvent(s).

In another embodiment, the dispersion consists essentially of, or even consists of, the salt, high-boiling point solvent(s), and one or more of a rheology modifier, surfactant, and/or cosolvent.

Use of Dispersion

The dispersions can be used as inks to print structures in printed electronics applications, such as printed sensors. This method involves simply forming a film of the dispersion or solution on a substrate. The film will typically be formed on a substrate such as those chosen from polyethylene terephthalate, polyimide, cyclic olefin polymer, glass-reinforced epoxy laminate (e.g., FR-4), breadboard, poly (methyl methacrylate), polyacrylate, epoxy, polyurethane, paper, polyester, polyethylene, silicon, SiGe, $SiO_2$, $Si_3N_4$, aluminum, tungsten, tungsten silicide, gallium arsenide, germanium, tantalum, tantalum nitride, tetramethyl silate and tetramethylcyclotetrasiloxane combinations (such as that sold under the name CORAL), SiCOH (such as that sold under the name Black Diamond, by SVM, Santa Clara, CA, US), sapphire, phosphorous or boron-doped glass, ion implant layers, titanium nitride, hafnium oxide, or silicon oxynitride. Suitable methods for forming these films include methods such as inkjet printing, screen printing, stencil coating, flexographic printing, gravure printing, spin coating, spray coating, roll-to-roll processing, and/or slot die coating.

Regardless of the formation method, the films are ultimately dried, with the thickness varying greatly, depending upon the printing method and intended application. Film drying may be performed by any suitable method, including baking in a vacuum oven, box oven, or conveyor oven. The preferred drying temperature is from about 45° C. to about 150° C., and more preferably from about 60° C. to about 90° C. for a time period of about 2 hours to about 4 hours. In one embodiment, the printed film has a thickness of from about 0.1 µm to about 1 mm, and preferably from about 0.5 µm to about 250 µm. Preferably, the impedance of the printed salt film in pure water is below about 5 k Ω, and more preferably below about 2 k Ω measured at about 5 kHz at a film thickness of about 5 µm to about 50 µm using a potentiostat (Gamry Instruments, Reference 3000, Warminster, PA, USA). A schematic depiction of a printed structure used for impedance testing is shown in FIG. 1, where the image on the left is a top-down view and the image on the right is a cross-sectional view of the image on the left. The gray bars depict printed electrodes, while the 3 mm by 1.5 mm area denoted as "Printed PFSA-Na Membrane" depicts the printed salt membrane described herein. (The membrane is transparent in the top-down view and white the cross-sectional view.) The dimensions are exemplary for an actual device but were used for impedance testing of the printed salt film.

In one embodiment, the film comprises less than about 10% by weight, preferably less than about 5% by weight, and more preferably about 0% by weight triethylammonium methanesulfonate. In another embodiment, the film comprises less than about 20% by weight, preferably less than about 10% by weight, and more preferably about 0% by weight triethylammonium perfluorobutanesulfonate. In a particularly preferred embodiment, the film comprises the foregoing triethylammonium and triethylammonium perfluorobutanesulfonate % by weight ranges in any combination.

In another embodiment the film consists essentially of, or even consists of, the previously described salt.

Advantageously, the formed dispersions allow for large-scale printing applications using the Nafion™ material. The printed film can be used in various applications or devices, including those chosen from sensors (e.g., water sensors, biosensors), electrodes, ion selective membranes, ion exchange membranes, impedance adjustors, ionic conductive binding, and/or fuel cells. Advantageously, the formed dispersions are pH neutral, which allows them to be printed without corrosion of metal printing tools or oxidation of metal electrodes. In one embodiment, the printed salt film can be transferred to its original acidic form, e.g.,

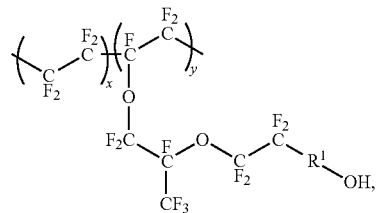

through normal ion exchange processing, such as through contact with a salt or acid solution.

Additional advantages of the various embodiments will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments but is not necessarily included. Thus, the present disclosure encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

EXAMPLES

The following examples set forth methods in accordance with the disclosure. It is to be understood, however, that these examples are provided by way of illustration and nothing therein should be taken as a limitation upon the overall scope.

Example 1

Preparation of Screen-Printable Ink Comprising PFSA/PTFE Polymer and Sodium

In this procedure, 100 grams of a dispersion of a chemically stabilized perfluorosulfonic acid ("PFSA")/polytetrafluoroethylene ("PTFE") copolymer (Nafion™ PFSA 20% Dispersions-D2021; Fuel Cell Store, College Station, Texas) was placed into a flask with an overhead agitator. The copolymer dispersion had a polymer content of 20-22% by weight in a mixture of water, alcohols, mixed ethers, and other VOCs. The starting polymer had an available acid capacity of >0.92 meq/g on a $H^+$ polymer basis.

1 gram of the same dispersion was then diluted with 49 grams of deionized (DI) water (18.2 (2). The diluted solution was then titrated with 0.1M $NaOH/H_2O$ solution (sodium hydroxide pellets for analysis; Sigma Aldrich, St. Louis, MO). Once the pH approached 7, a wait period of 3-5 minutes was used for every added drop of $NaOH/H_2O$ to allow the neutralization complete, which converted the solution from proton form to sodium form. The titration was performed using a HI-902C2 potentiometric titrator (Hanna Instruments, Pages Industrial Park, Leighton Buzzard, Bedfordshire, UK).

Based on the titration result for 1 gram of the dispersion, the amount of $NaOH/H_2O$ solution necessary to titrate 100 grams of the dispersion was calculated and added into the original flask. The resulting dispersion was stirred for about 8-12 hours at 30° C. to complete the neutralization. Then, 80 grams of 2-methyl-1,3-propanediol (Sigma Aldrich, St. Louis, MO) was added to the neutralized dispersion, and was then stirred for another 2-4 hours to completely solubilize the dispersion. The solution was then transferred into a round glass flask and was rotor evaporated at 60° C. with vacuum, becoming more and more viscous. The sample was tested for solids content, and rotor evaporation was stopped when the sample reached 25% by weight solids.

Example 2

Screen Printing of Ink from Example 1

Figure 2:
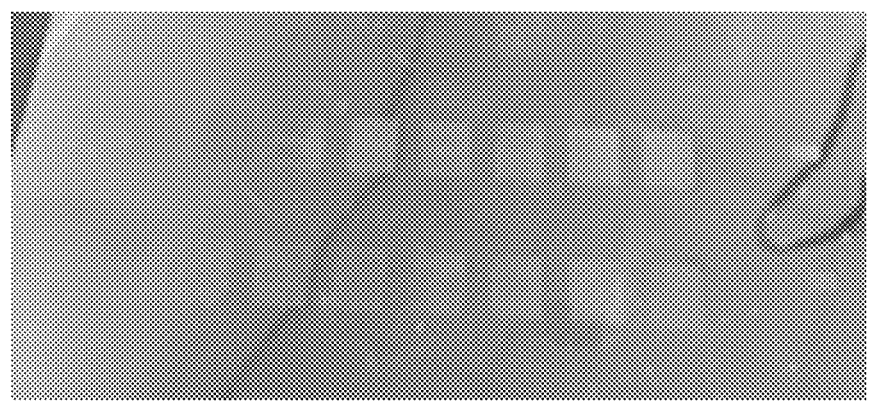
FIG. 2 is a screen-printed film as prepared in Example 2.

The material prepared in Example 1 was screen printed onto a substrate that was a polyimide film coated with a high temperature silicone adhesive (DUPONT® KAPTON®; obtained from CS Hyde Company, Lake Villa, Illinois) using an ATMA AT-60PD Electric Flat Screen Printer (Taipei, Taiwan) with the following parameters: 1-1.5 mm squeegee and flood bar height, 10° squeegee and flood bar angle, 150 mm/s squeegee and flood bar print speed, 1 mm print off contact, and 5 bar squeegee and flood bar pressure. The print was then cured in a StableTemp 282A vacuum oven at 60° C. overnight. The screen print thickness was about 1.5 micron when measured on a DEKTAK® 3030 profilometer (Bruker Corporation). The print is shown in FIG. 2.

Example 3

Preparation of Ink Comprising PFSA/PTFE Polymer and Tetrabutylammonium

In this procedure, 100 grams of the same Nafion™ D2021 polymer dispersion used in Example 1 was placed into a 3-neck flask with overhead agitator. 1 gram of the same dispersion was then diluted with 50 grams of deionized (DI) water. The diluted solution was then titrated with 1% tetrabutylammonium hydroxide (diluted from 40 wt. % in water, Sigma-Aldrich, St. Louis, MO). Once the pH approached 7, a wait period of 3-5 minutes was used for every added drop of $NaOH/H_2O$ to allow the neutralization complete, which converted the solution from proton form to sodium form. The titration was performed using a HI-902C2 potentiometric titrator.

Based on the titration result for 1 gram of the dispersion, the amount of tetrabutylammonium hydroxide solution necessary to titrate 100 grams of the dispersion was calculated and added into the original flask, and the flask was stirred for another 8 hours to allow the neutralization to complete. Then, 80 grams of 2-methyl-1,3-propanediol was added to the neutralized dispersion, and it was stirred for another 2 hours. The dispersion was the transferred to a round glass flask and was rotor evaporated at 60° C. with vacuum, becoming more and more viscous. The sample was tested for solids content, and rotor evaporation was stopped when the sample reached 17.5% by weight solids.

Example 4

Screen Printing of Ink from Example 3

Figure 3:
FIG. 3 is a screen-printed film as prepared in Example 4.

The material prepared in Example 3 was screen printed onto a substrate that was a polyimide film coated with a high temperature silicone adhesive (DUPONT® KAPTON®) using an ATMA AT-60PD Electric Flat Screen Printer (Taipei, Taiwan) with the following parameters: 1-1.5 mm squeegee and flood bar height, 10° squeegee and flood bar angle, 150 mm/s squeegee and flood bar print speed, 1 mm print off contact, and 5 bar squeegee and flood bar pressure. The print was then cured in a StableTemp 282A vacuum oven at 60° C. overnight. The screen print thickness was about 1 micron when measured on a DEKTAK® 3030 profilometer (Bruker Corporation). The print is shown in FIG. 3.

Example 5

Preparation of Ink Comprising PFSA/PTFE Polymer and Sodium with Rheology Modifier In this procedure, 50 grams of the same Nafion™ D2021 polymer salt dispersion with a solids content of about 15 wt % was prepared as described in Example 1. A rheology modifier that is an organic derivative of bentonite clay (BENTONE SD®-2; Elementis, Windsor, NJ) was added at 1 wt. % modifier based on the total amount of the prepared Nafion™ D2021 polymer salt dispersion, followed by mixing three times with a three-roll mill (EXACT®, 80E PLUS/01119, Norderstedt, Germany) with a front gap of 10 μm, back gap of 10 μm, and processing time of 10 minutes.

Example 6

Screen Printing of Ink from Example 5

Figure 4:
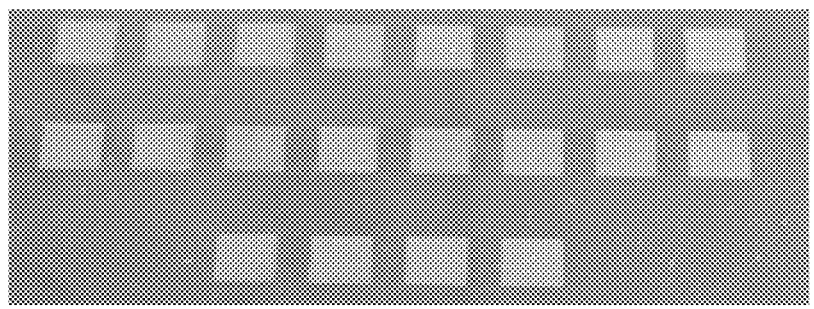
FIG. 4 is a screen-printed film as prepared in Example 6.

The material from Example 5 was screen printed onto a polyimide film (same as used in Example 2) using an ATMA Electric Flat Screen Printer with the following parameters: 1-1.5 mm squeegee and flood bar height, 10° squeegee and flood bar angle, 150 mm/s squeegee and flood bar print speed, 1 mm print off contact, and 5 bar squeegee and flood bar pressure. The print was then cured in a box oven at 60° C. overnight. The screen print thickness was about 1 micron when measured on a DEKTAK® profilometer. The print is shown in FIG. 4.

Example 7

Preparation of Ink-Jet-Printable Ink Comprising PFSA/PTFE Polymer and Sodium

In this procedure, 0.25 grams of the Nafion™ D2021 polymer salt dispersion was prepared as described in Example 1. Then, 49.75 grams of ethylene glycol butyl ether (>99%, Sigma-Aldrich, St. Louis, MO) were added as co-solvent and mixed to form a dispersion with low viscosity (2.9 cP at 20° C.).

Example 8

Ink-Jet Printing of Ink from Example 7

Figure 5:
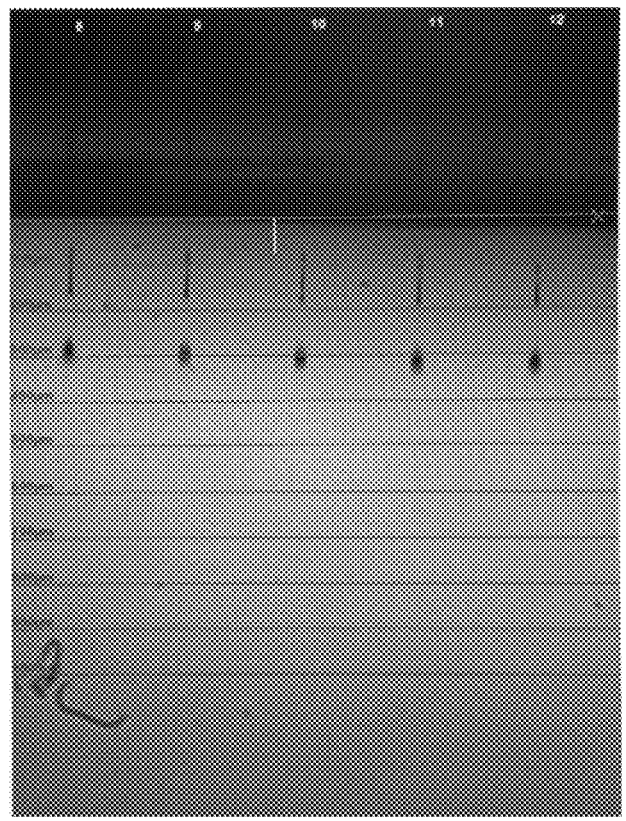
FIG. 5 is an image of the droplets in an ink-jet printer as described in Example 8.
Figure 6:
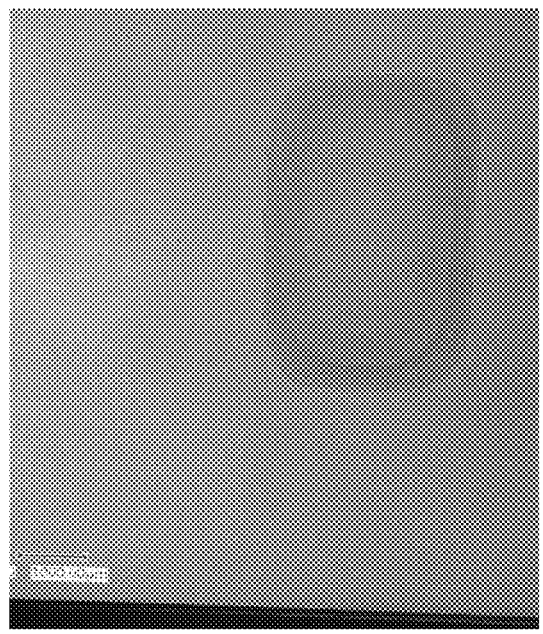
FIG. 6 is the inkjet printed features described in Example 8.

The material from Example 7 was inkjet printed onto a cyclic olefin substrate (ZF Film Series, Zeon Chemicals L.P, 4111 Bells Lane, Louisville, Kentucky, USA) using Ceradrop Inkjet printer (F-Serie, All-in-one State-of-the-art Digital Materials Deposition Platform, 32 rue de Soyouz, Parc d'Ester Technopole, Limoges, France). The picture of jetting droplets is shown in FIG. 5, and the printed film is shown in FIG. 6.

We claim:

1. A method comprising:
reacting a polymer dispersed or dissolved in a solvent system with a base to form a salt dispersion or solution comprising a salt of said polymer, wherein said solvent system comprises one or more original solvents and wherein said polymer comprises

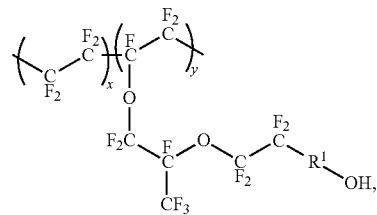

where $R^1$ is chosen from

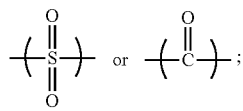

adding a new solvent to said salt dispersion or solution to form a solvent swap dispersion or solution, said new solvent being different from said one or more original solvents and said new solvent having a boiling point in the range of 125° C. to 250° C.;
removing the majority of said one or more original solvents from said solvent swap dispersion or solution to yield a solvent-swapped dispersion or solution; and
forming a film of said solvent-swapped dispersion or solution on a surface of a substrate.

2. The method of claim 1, wherein said base is chosen from sodium hydroxide, tetrabutylammonium hydroxide, silver acetate, silver lactate, zinc acetate, potassium hydroxide, tetraethylammonium hydroxide, tetramethylammonium hydroxide, sodium bicarbonate, ammonium hydroxide, sodium carbonate, or mixtures thereof.

3. The method of claim 1, wherein said reacting comprises adding said base until said salt dispersion or solution has a pH of about 6.3 to about 7.2.

4. The method of claim 1, wherein said new solvent is chosen from 2-methyl-1,3 propanediol, 1,2-propanediol, 1,3-propanediol, 1,2-butanediol, 2,3-butanediol, 1,3-butanediol, 1,4-butanediol, 1,2-pentanediol, 2,4-pendanediol, 1,2-hexanediol, glycerol, 1,2,4-butanetriol butyl carbitol acetate, propylene carbonate, dimethyl glutarate, diethyl adipate, dimethyl adipate, propiophenone, N,N-dimethylacetamide, N,N-dimethylformamide, N-methyl-pyrrolidone, dimethyl sulfoxide, ethylene glycol, or mixtures thereof.

5. The method of claim 1, wherein said salt comprises one or more of a sodium salt, potassium salt, silver salt, ammonium salt, tetramethylammonium salt, tetraethylammonium salt, tetrabutylammonium salt, or zinc salt of said polymer.

6. The method of claim 5, said salt comprising

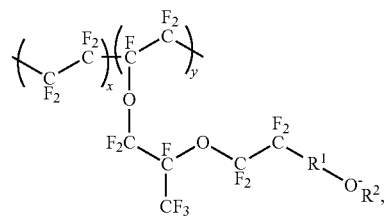

wherein $R^2$ is chosen from $Na^+$, $K^+Ag^+$, $NH^{4+}$, $Zn^{2+}$,

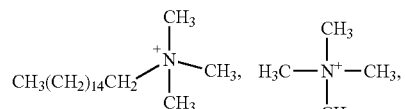

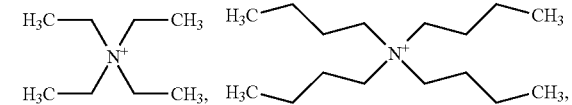

or mixtures of the foregoing.

7. The method of claim 1, wherein said substrate is chosen from one or more of the following substrates: polyethylene terephthalate, polyimide, cyclic olefin polymer, glass-reinforced epoxy laminate, breadboard, poly(methyl methacrylate), polyacrylate, epoxy, polyurethane, paper, polyester, polyethylene, silicon, SiGe, $SiO_2$, $Si_3N_4$, aluminum, tungsten, tungsten silicide, gallium arsenide, germanium, tantalum, tantalum nitride, tetramethyl silate and tetramethylcyclotetrasiloxane combinations, SiCOH, sapphire, phosphorous or boron-doped glass, ion implant layers, titanium nitride, hafnium oxide, or silicon oxynitride.

8. The method of claim 1, wherein said forming comprises using at least one of the following: inkjet printing, screen printing, stencil coating, flexographic printing, gravure printing, spin coating, spray coating, roll-to-roll processing, or slot die coating.

9. The method of claim 1, wherein said film is a dry film having a thickness of about 0.1 μm to about 1 mm.

10. The method of claim 1, further comprising subjecting said film to an ion exchange process so as to convert the salt to the polymer having the structure

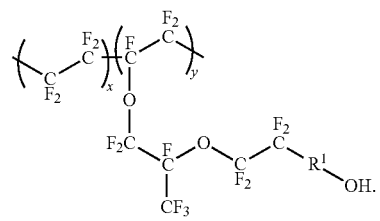
* * * * *